(12) United States Patent
Mori et al.

(10) Patent No.: US 7,748,020 B2
(45) Date of Patent: Jun. 29, 2010

(54) RECEIVING APPARATUS AND METHOD FOR PROCESSING INTERRUPTIONS IN STREAMING BROADCASTS

(75) Inventors: Shigeki Mori, Saitama (JP); Tetsu Fukuda, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 1292 days.

(21) Appl. No.: 10/665,426

(22) Filed: Sep. 22, 2003

(65) Prior Publication Data

US 2004/0068746 A1    Apr. 8, 2004

(30) Foreign Application Priority Data

Oct. 8, 2002    (JP)    ............... 2002-295060

(51) Int. Cl.
*H04N 7/173*    (2006.01)
(52) U.S. Cl. .................. 725/89; 725/133; 725/134; 725/142; 709/231
(58) Field of Classification Search .......... 725/88, 725/102, 133; 370/468; 714/751; 709/231–235; 369/47; 710/52; 386/1, 46, 68, 69
See application file for complete search history.

(56) References Cited

U.S. PATENT DOCUMENTS

| | | | |
|---|---|---|---|
| 5,721,829 A * | 2/1998 | Dunn et al. ............... 725/87 |
| 6,452,943 B1 * | 9/2002 | Furuya ....................... 370/468 |
| 6,604,215 B1 * | 8/2003 | Chiba ........................ 714/751 |
| 6,654,416 B1 * | 11/2003 | Alexandre et al. ...... 375/240.02 |
| 7,266,341 B2 * | 9/2007 | Nakamura ................ 455/3.01 |
| 2002/0063797 A1 | 5/2002 | Aratani et al. ............ 348/553 |
| 2002/0162111 A1 * | 10/2002 | Shimizu et al. ........... 725/87 |
| 2003/0033603 A1 | 2/2003 | Mori et al. ................ 725/46 |
| 2003/0039465 A1 * | 2/2003 | Bjorgan et al. ............ 386/20 |
| 2003/0066078 A1 * | 4/2003 | Bjorgan et al. ............ 725/34 |

(Continued)

FOREIGN PATENT DOCUMENTS

EP    1 246 417 A2    10/2002

(Continued)

OTHER PUBLICATIONS

Hannuksela et al. Method for Error concealment in video sequences, 60396489, Jul. 15, 2002.*

(Continued)

*Primary Examiner*—Scott Beliveau
*Assistant Examiner*—Alan Luong
(74) *Attorney, Agent, or Firm*—Fitzpatrick, Cella, Harper & Scinto

(57) ABSTRACT

In order to maintain continuity before and after interruption of a streaming broadcast, a receiving apparatus according to the present invention includes: a reception unit which receives data on a stream broadcast; a memory which is capable of storing a predetermined amount of the received data on a stream broadcast; a data processing unit which processes the data on a stream broadcast to generate video data for the stream broadcast; a video output unit which outputs the video data to a display apparatus; and a detection unit which detects interruption point data indicating a position where the stream broadcast should be interrupted out of the received data on a stream broadcast; when an abnormality is detected, the output of the video data is stopped at a position instructed in the interruption point data detected by the detection unit.

7 Claims, 12 Drawing Sheets

U.S. PATENT DOCUMENTS

| | | |
|---|---|---|
| 2003/0149985 A1* | 8/2003 | Ohno et al. ............... 725/58 |
| 2003/0208625 A1* | 11/2003 | Nishio et al. ............ 709/245 |
| 2004/0061805 A1* | 4/2004 | Shibamiya et al. ........ 348/565 |
| 2004/0068746 A1* | 4/2004 | Mori et al. ............... 725/88 |
| 2004/0139462 A1* | 7/2004 | Hannuksela et al. ....... 725/32 |

FOREIGN PATENT DOCUMENTS

| | | | |
|---|---|---|---|
| JP | 2001-128139 | | 5/2001 |
| JP | 2001-359073 | | 12/2001 |
| JP | 2001359073 A | * | 12/2001 |
| JP | 2002-84471 | | 3/2002 |
| JP | 2002-359833 | | 12/2002 |

OTHER PUBLICATIONS

Aug. 3, 2007 Chinese Official Action in Chinese Patent Appln. No. 2005101251879 (with English-language translation).

* cited by examiner

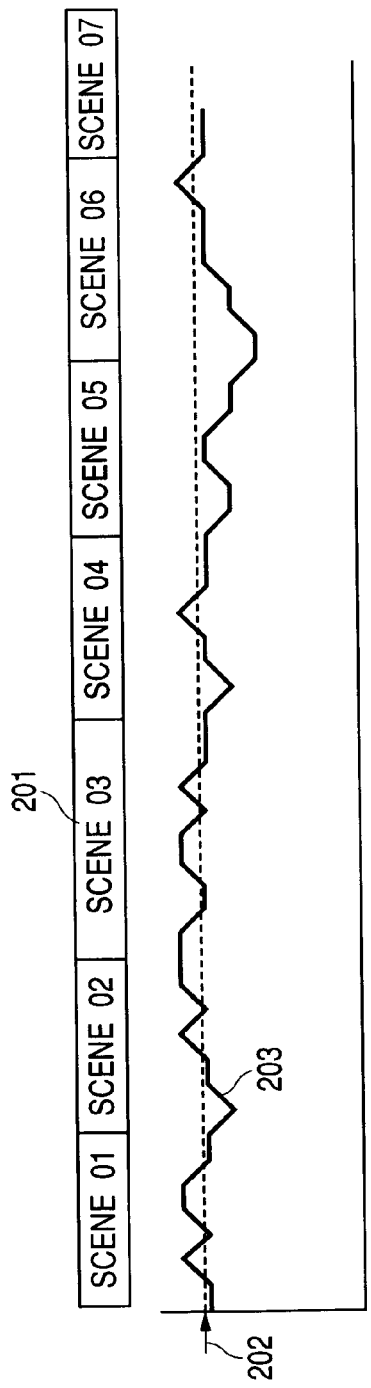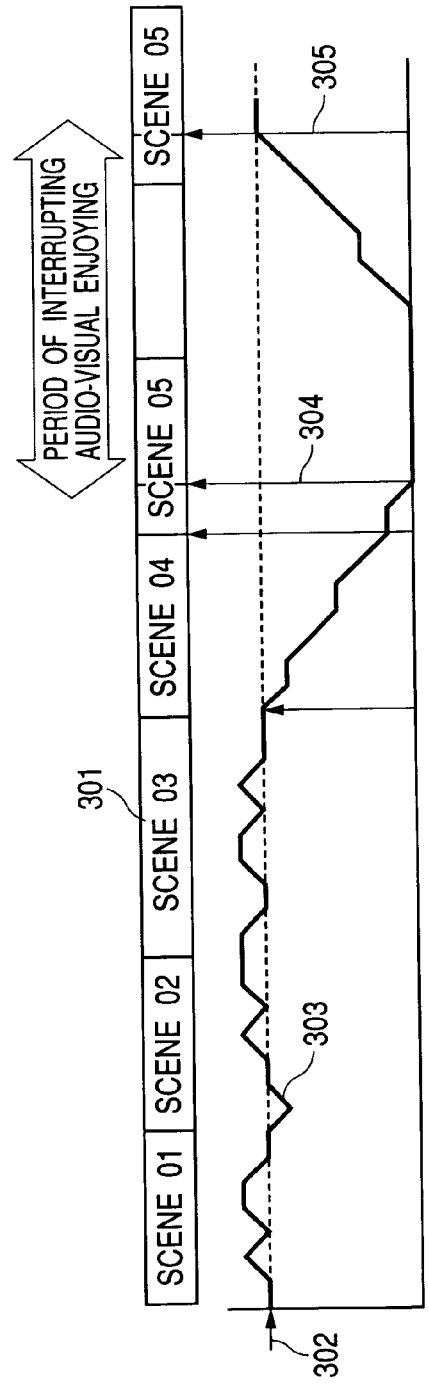

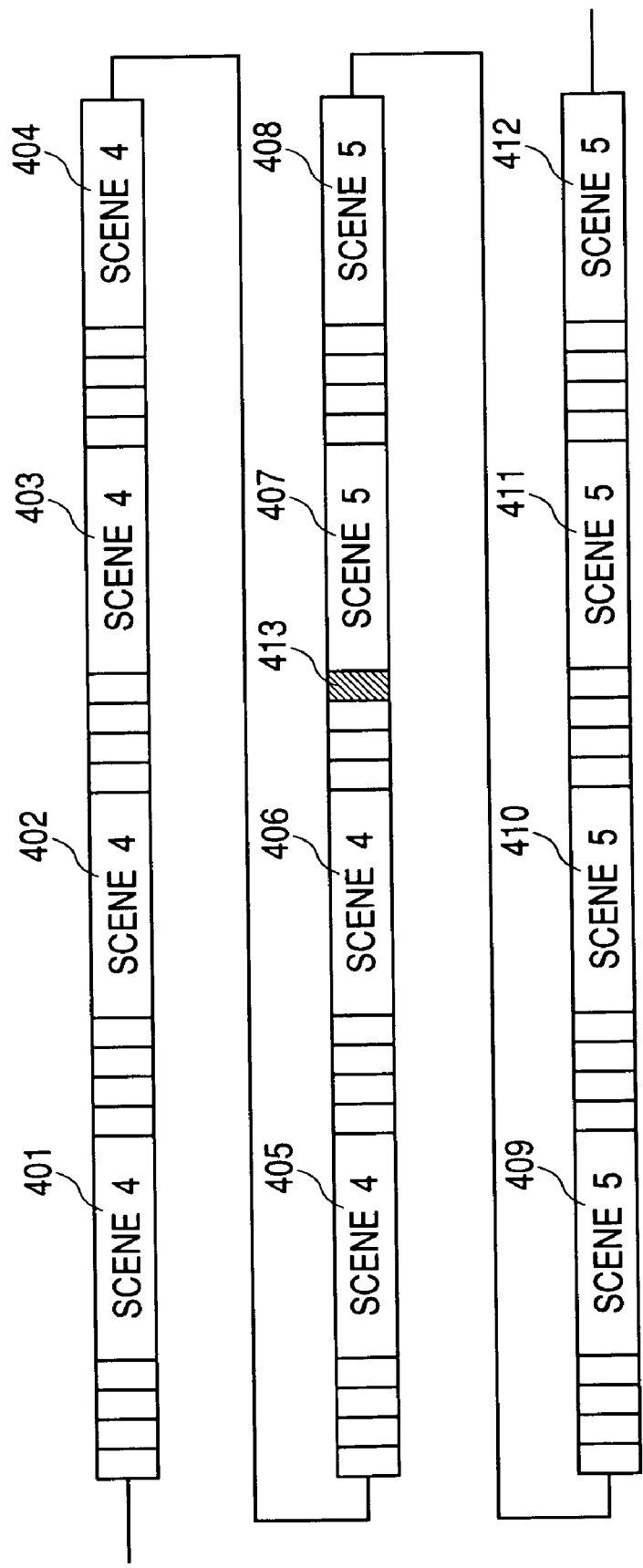

RECEIVING APPARATUS AND METHOD FOR PROCESSING INTERRUPTIONS IN STREAMING BROADCASTS

BACKGROUND OF THE INVENTION

1. Field of the Invention

The present invention relates to a receiving apparatus, and in particular to an apparatus and a method which are capable of receiving a streaming broadcast via a network.

2. Related Background Art

Conventionally, there is known an apparatus for receiving a digital television broadcast. In recent years, a streaming broadcast, which distributes digital broadcast data via a network, has been performed.

In the case of receiving and viewing the streaming broadcast, packet information of the streaming broadcast as shown in FIG. 1 composed of various target formats is separated from packet information of the network which is received through the network. Then, the packet information is reproduced by a player, which corresponds to the respective streaming broadcast formats, and viewed.

At this point, the packet information of the streaming broadcast is not collectively or continuously recorded on a storage device in a receiving apparatus for the purpose of contents protection for preventing illegal usage of the contents. However, in order to sequentially process independent image data, audio data, or header information for synchronization, which are included in the packet information of the streaming broadcast, received streaming data is temporarily buffered, and then the packet information is reproduced after decode processing and synchronization processing of each data are performed.

In addition, in this case, information necessary for reproduction is erased immediately at a point when reproduction of the packet information part of the streaming broadcast is completed, whereby a purpose of contents protection is also realized.

In this way, in audio-visual viewing of the streaming broadcast, even in the case in which packet information cannot be received continuously owing to an influence of a trouble on the network, an influence of server load on a sender side of the streaming broadcast, or an influence of a processing procedure or the like for reproduction, the influence is absorbed by buffering to some extent. As a result, as shown in FIG. 2, audio-visual viewing is not interrupted, although a buffering quantity fluctuates with time more or less, and stable audio-visual viewing and reproduction of the streaming broadcast are realized. As a reception system of a streaming broadcast of this type, one described in Japanese Patent Application Laid-Open No. 2001-359073 is known.

However, even in such a structure, owing to various unrecoverable troubles of the network to which the receiving apparatus is connected, an increase in server load caused by unexpected access of viewers, or the like, as shown in FIG. 3, the buffering quantity of the packet information of the streaming broadcast decreases, and the packet information of the streaming broadcast which should be reproduced on a real time basis runs out. As a result, the streaming broadcast under audio-visual viewing may be interrupted suddenly regardless of partitions of scenes.

In this case, audio-visual viewing is suddenly interrupted without any warning to a user and totally regardless of a plot of a story even if the streaming broadcast under audio-visual viewing is in an important introduction which leads a viewer into the world of a story, in a climax scene in the middle stage, or right in the middle of an unexpected twist in the final stage. As a result, amusement of the streaming broadcast for the viewer is lost.

A story such as a drama has been described above as an example of the streaming broadcast. However, news, a documentary, a musical program, or the like is the same in that amusement is lost owing to interruption of the streaming program in the middle of a piece of news or one tune.

As a result, since the viewer feels the program is not amusing, a provider of contents of the streaming broadcast and a streaming broadcasting station, and even the viewer suffer disadvantages, respectively.

In addition, even when the trouble on the network or the server load is solved, buffering of the streaming broadcast is restarted, and audio-visual viewing becomes possible, since the broadcast is restarted regardless of partitions of scenes as in the interruption of the streaming broadcast, continuity of the story is lost to confuse the viewer.

SUMMARY OF THE INVENTION

It is an object of the present invention to provide a receiving apparatus and a receiving method which can prevent confusion before and after interruption of a streaming broadcast.

According to a gist of the present invention, a receiving apparatus includes:

reception means for receiving data on a stream broadcast via a network;

a memory which is capable of storing a predetermined amount of the received data on a stream broadcast;

data processing means for processing the data on a stream broadcast stored on the memory to generate video data for the stream broadcast;

video output means for outputting the video data to a display apparatus;

detection means for detecting interruption point data indicating a position where the stream broadcast should be interrupted out of the received data on a stream broadcast; and control means for, when a state at which the stream broadcast should be interrupted is detected, controlling the data processing means and the video output means to stop the output of the video data at a position instructed in the interruption point data detected by the detection means.

According to another gist of the present invention, a receiving method includes the steps of:

receiving data on a stream broadcast via a network;

storing of the received data on a stream broadcast on a memory;

processing the data on a stream broadcast stored on the memory to generate video data for the stream broadcast;

outputting the video data for display;

detecting interruption point data indicating a position where the stream broadcast should be interrupted out of the received data on a stream broadcast; and stopping the output of the video data at a position instructed in the detected interruption point data when a state at which the stream broadcast should be interrupted is detected.

According to the present invention as described above, the following options are more preferably selected.

1) The control means monitors abnormality of communication based upon a stored data amount of the memory and a communication rate of the data on a stream broadcast by the reception means.

2) The control means further controls the data processing means and the video output means to restart the output of the video data from the position instructed in the interruption point data in response to an amount of data of the data on a stream broadcast stored on the memory having reached a predetermined amount after stopping the output of the video data.

3) The control means further detects an estimated time when the output of the video data can be restarted based upon the amount of data, which is stored on the memory while the output of the video data is stopped, and the communication rate, and then controls the video output means to display information of the estimated time.

4) The detection means further detects restart point data indicating a restart point after stopping the video output out of the data on a stream broadcast, and controls the data processing means and the video output means to restart the output of the video data from a position instructed in the detected restart point data.

5) The control means further controls the video output means to output predetermined video data instead of video data according to the data on a stream broadcast after stopping the output of the video data.

6) In the case in which an amount of data of the data on a stream broadcast stored on the memory has reached a predetermined amount after stopping the output of the video data, the control means further controls the data processing means and the video output means to restart the output of the video data from a position instructed in the interruption point data after the predetermined video data ends.

7) The detection means further detects location information of a second distribution server, which is capable of distributing data on a stream broadcast at or after the interruption point, out of the data on a stream broadcast, and the control means controls the reception means to make connection to the second distribution server when abnormality of communication is detected.

8) The detection means further detects two kinds of levels of the interruption point data out of the data on a stream broadcast, and the control means selects the two kinds of levels of the interruption point data according to a type of a communication rate of the connected network.

9) The interruption point data is data which designates a position where the stream broadcast should be interrupted after a CM ends and before a program following the CM starts, which are included in the data on a stream broadcast.

BRIEF DESCRIPTION OF THE DRAWINGS

FIG. 2 is a diagram showing a reception state of data on a stream broadcast;

FIG. 3 is a diagram showing a reception state of data on a stream broadcast;

FIG. 4 is a diagram showing a state of data on a stream broadcast treated in an embodiment of the present invention;

DETAILED DESCRIPTION OF THE PREFERRED EMBODIMENTS

An embodiment of the present invention presents a receiving apparatus including: reception means for receiving data on a stream broadcast via a network; a memory which is capable of storing a predetermined amount of the received data on a stream broadcast; data processing means for processing the data on a stream broadcast stored on the memory to generate video data for the stream broadcast; video output means for outputting the video data to a display apparatus; detection means for detecting interruption point data indicating a position where the stream broadcast should be interrupted out of the received data on a stream broadcast; and control means for, if a state in which the stream broadcast should be interrupted such as an abnormality in communication of the data on a stream broadcast by the reception means, abnormality of a power supply of the receiving apparatus, or switching of a channel is detected, controlling the data processing means and the video output means to stop the output of the video data in a position instructed in the interruption point data detected by the detection means.

First Embodiment

Figure 12:
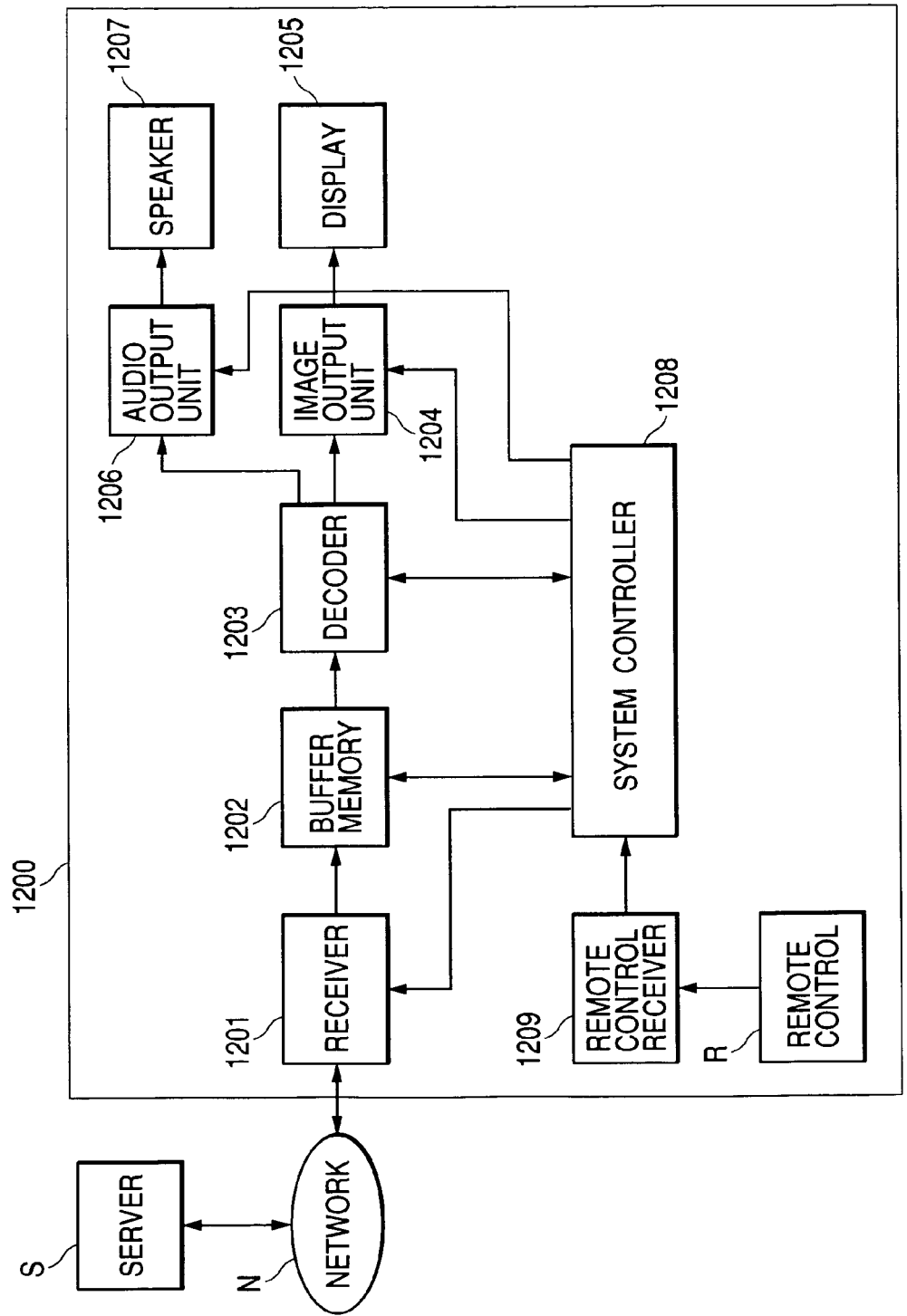
FIG. 12 is a block diagram showing a structure of a receiving apparatus to which the present invention is applied.

FIG. 12 is a diagram showing a structure of a receiving apparatus to which the present invention is applied.

A receiving apparatus 1200 of FIG. 12 is connected to a server S for streaming broadcast distribution via a network N. In addition, in FIG. 12, reference numeral 1201 denotes a receiver which receives streaming broadcast data; 1202, a buffer memory which is capable of storing a predetermined amount of received data; 1203, a decoder which reads out the data from the buffer memory 1202 and decodes the data in a decoding system corresponding to video data and audio data thereof; 1204, a video output unit which converts the decoded video data into a displayable form and displays various kinds of information on a display 1205; 1205, a display; 1206, an audio output unit which amplifies and converts the decoded audio data into a form suitable for being outputted to a speaker; 1207, a speaker; 1208, a system controller which controls the respective components of the receiving apparatus 1200; and 1209, a remote control receiver which receives a command from a remote controller R and outputs the command to the system controller 1208.

Figure 1:
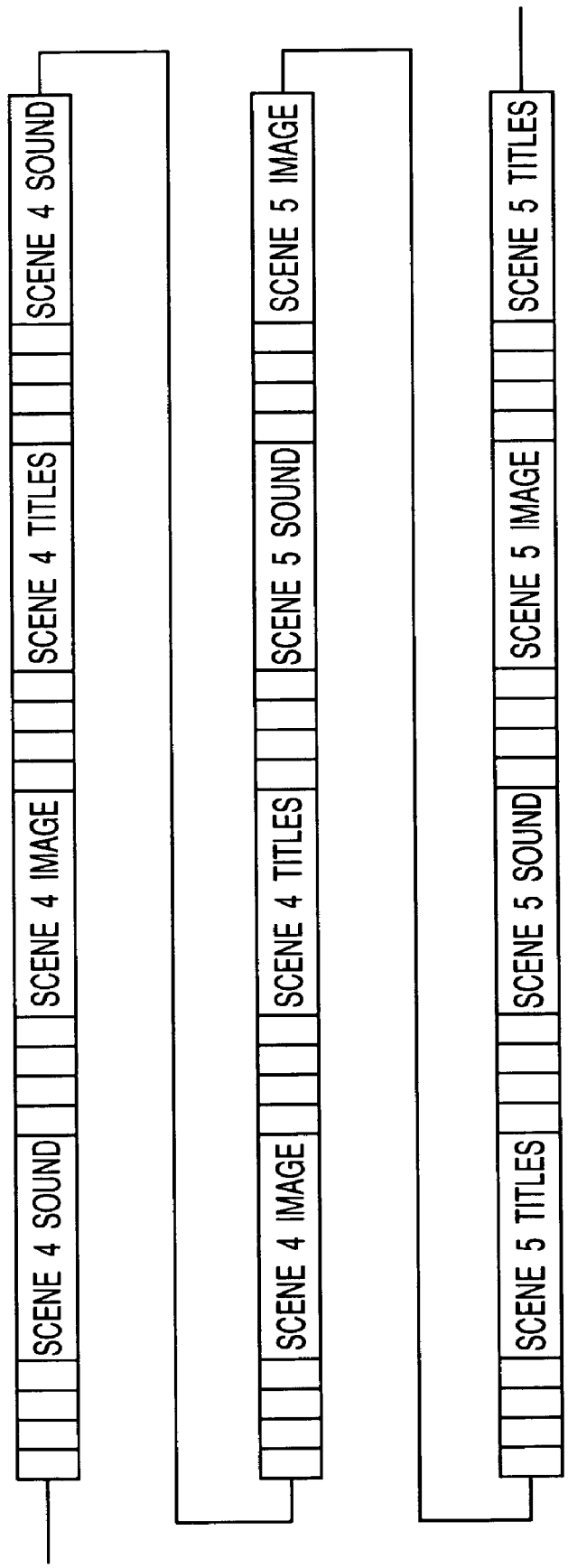
FIG. 1 is a diagram showing a state of data on a stream broadcast.
Figure 5:
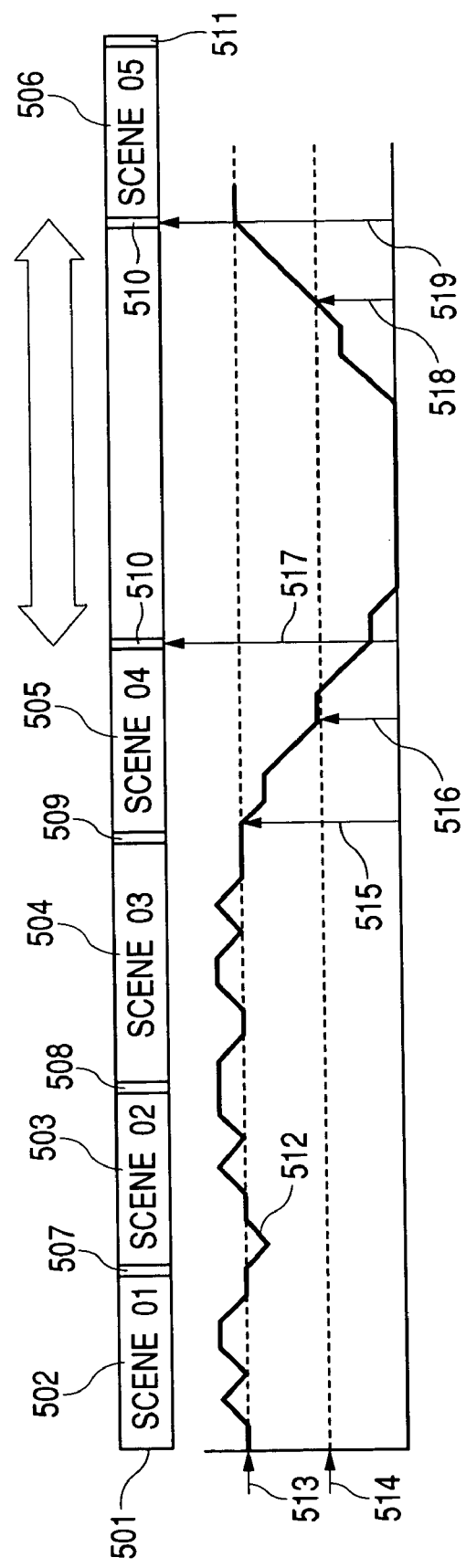
FIG. 5 is a diagram showing a reception state of data on a stream broadcast.

In addition, FIGS. 4 and 5 are diagrams for explaining operations of the receiving apparatus 1200. FIG. 4 shows a packet information group constituting data of a streaming broadcast. The former half of FIG. 4 indicates a packet information group constituting a last part of a scene 4 of a program, and a latter half of FIG. 4 indicates a packet information group constituting an opening part of a scene 5 of the program. The packet information shown in FIG. 4 is accompanied by header information, respectively. Various kinds of information necessary for reproduction of the streaming broadcast is described in the header information, and a part of the header information is kept for new additional information as a reserve area. However, in this embodiment, since details of the packet information used for the streaming broadcast are not directly related, there are many kinds of packet information, and information is not disclosed for many formats thereof, a description of the details will be omitted here.

FIG. 5 is a diagram showing a stream 501 of the streaming broadcast constituted of the packet information of FIG. 4 and a change in buffering quantity 512. Reference numerals 502 to 505 denote scenes of a streaming broadcast program, and 507 to 511 denote partitioning position information recorded in a header of the packet information existing at the top of each of the scene. Here, a header of other packet information in which partitioning information is not recorded will not be described.

Figure 6:
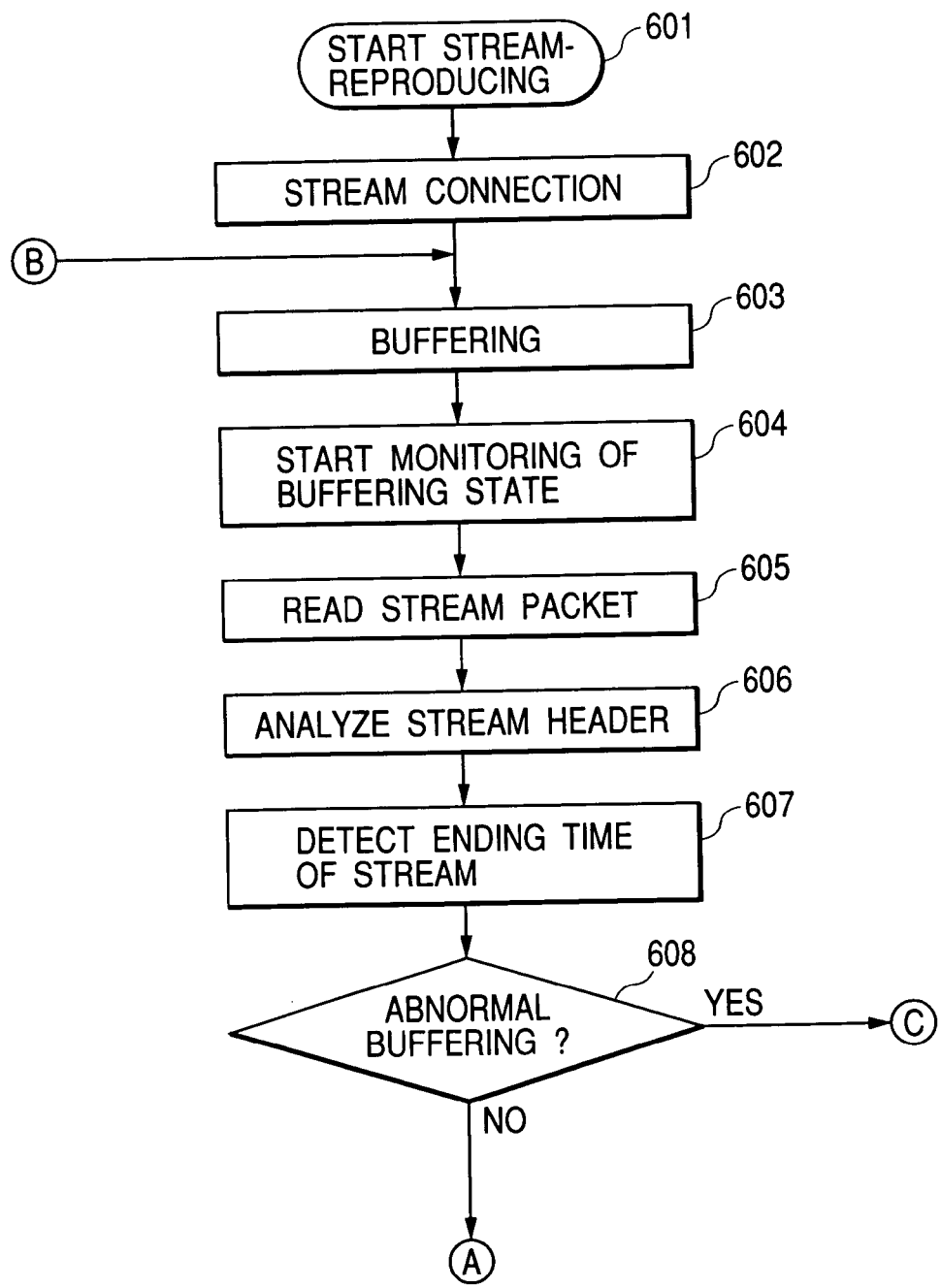
FIG. 6 is comprised of FIGS. 6A and 6B showing flowcharts for operations of a receiving apparatus in accordance with the present invention.
Figure 6B:
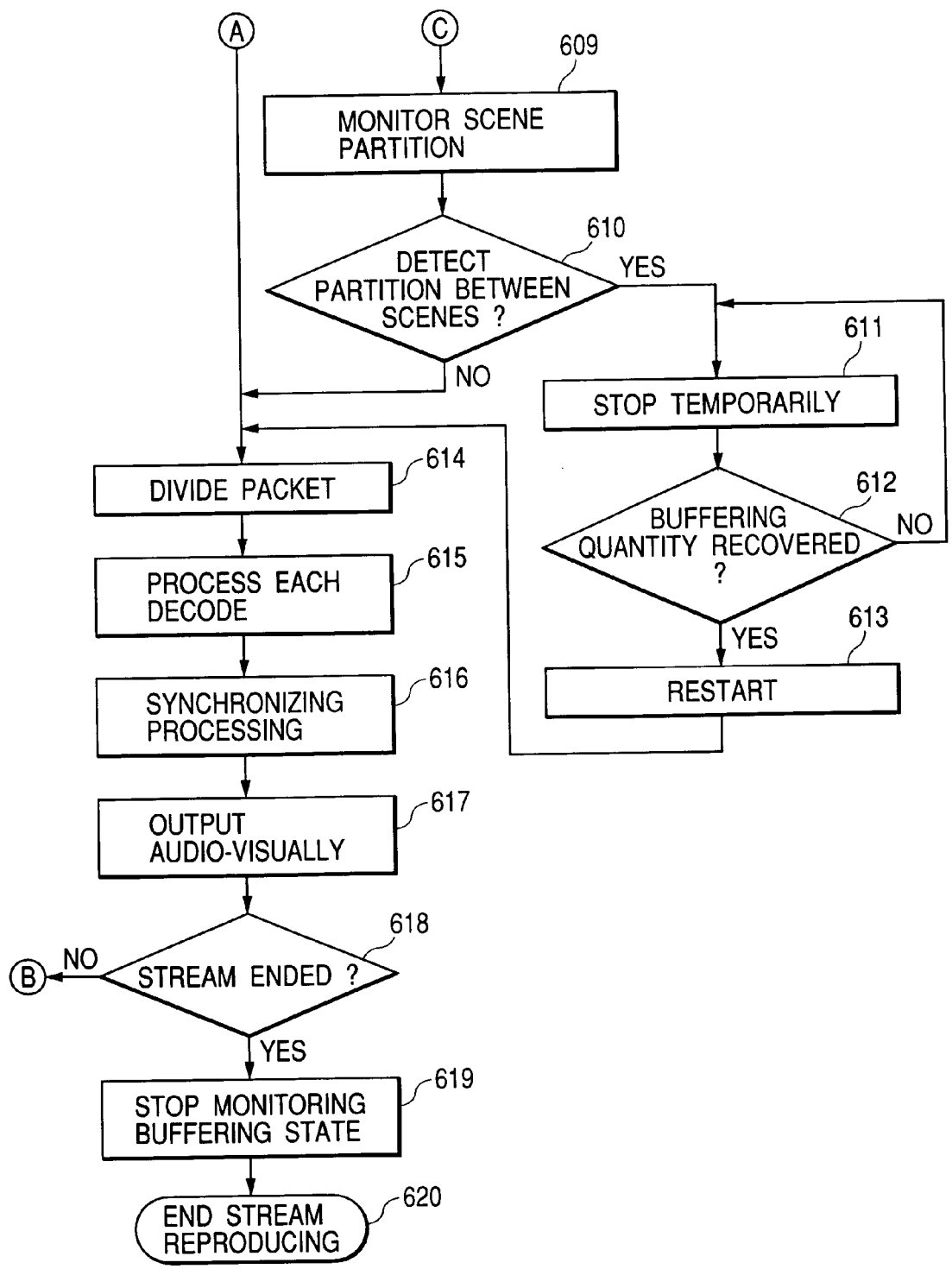
Figure 7:
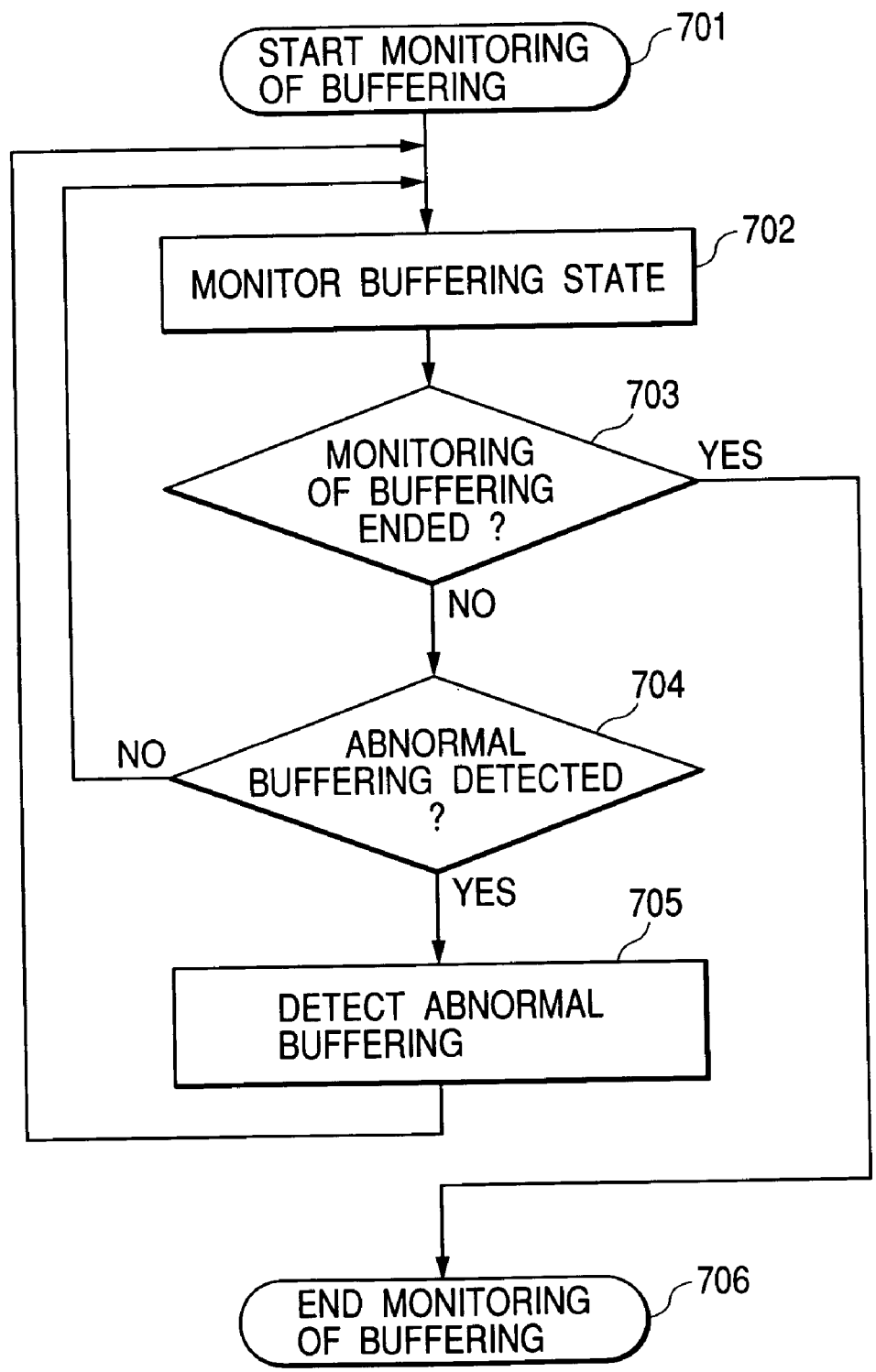
FIG. 7 is a flowchart showing operations of the receiving apparatus in accordance with the present invention.

FIGS. 6A, 6B and 7 are flowcharts showing operations of the system controller 1208 of the receiving apparatus 1200 after audio-visual viewing is started for a streaming broadcast selected by a viewer. FIGS. 6A and 6B are flowcharts of processing which is started up when the viewer selects a program of a specific streaming broadcast and reading packet information of the streaming broadcast is started via a network. FIG. 7 shows a flowchart of processing of a task for monitoring a state of buffering started by the processing of FIGS. 6A and 6B.

In FIGS. 6A and 6B, 601 is a starting point of processing, 602 is a step of connecting packet data of a target streaming broadcast to a specific port of the receiving apparatus 1200, 603 is a step of starting buffering, 604 is a step of starting up a task for monitoring buffering, 605 is a step of reading buffered packet data of a streaming broadcast, 606 is a step of analyzing a header part of the read packet data, 607 is a step of detecting an ending time of a stream, 608 is a step of detecting and judging information from a task for monitoring abnormality of buffering, 609 is a step of checking whether or not a scene partition signal exists in the header part of the packet data of the streaming broadcast, 610 is a step of judging a result of checking in 609, 611 is a step of temporarily stopping audio-visual viewing of the streaming broadcast, 612 is a step of continuously judging whether or not a state of buffering is abnormal, 613 is a step of restarting audio-visual viewing of the streaming broadcast, 614 is a step of dividing the packet data of the streaming broadcast in order to subject the packet data to decode processing, 615 is a step of subjecting the divided packet data to the decode processing, 616 is a step of synchronizing the data subjected to the decode processing, 617 is a step of outputting synchronized video and audio information, 618 is a step of judging whether or not the stream has ended, 619 is a step of stopping the task for monitoring buffering, and 620 is a step of ending reproduction of the streaming broadcast.

In addition, in FIG. 7, 701 is a starting point of the task for monitoring abnormality of buffering, 702 is a step of monitoring a state of buffering, 703 is a step of judging whether or not a result of monitoring shows abnormality of buffering, 704 is a step of notifying abnormality of buffering, 705 is a step of judging whether or not to end the task for monitoring abnormality of buffering, and 706 is a step of ending the task for monitoring abnormality of buffering.

Operations of this embodiment will be hereinafter described with reference to FIGS. 4 to 7.

FIG. 4 is a diagram showing continuous packet data from 401 to 412 as a part of stream data of a streaming broadcast which a viewer has selected and is about to view. In FIG. 4, the packet data from 401 to 406 indicates a specific scene in a program of the streaming broadcast, that is, a last part of a scene 4, and the packet data from 407 to 412 indicates an opening part of a scene 5 in the same manner.

The respective packet data represent code data such as video data, audio data, synchronization data, and subtitles, and any packet data is accompanied by a header part in which information on the data packet itself, an instruction for synchronizing operation, and the like are described. In particular, partition data 413 indicating a partition between the scene 4 and the scene 5 is written in the header part of the packet data 407.

Next, when the viewer selects the data of the streaming broadcast shown in FIG. 4 with the remote controller R and sends an instruction to start audio-visual viewing to the receiving apparatus 1200, the operations shown in FIGS. 6A and 6B are started from step 601.

In step 602, the system controller 1208 connects the receiver 1201 for processing the data of the streaming broadcast selected earlier to a port and, in step 603, starts buffering processing (storage processing) of the data with respect to the buffer memory 1202. In this buffering processing, the plural packet data shown in FIG. 4 is read in the buffer in advance.

In step 604, the buffering monitoring task shown in FIG. 7 for monitoring whether or not the buffered data of the streaming broadcast is normally buffered is started up.

Step 701 of FIG. 7 is an entry point of the buffering monitoring task. In step 702, the system controller 1208 monitors a state of buffering and checks an abnormal state such as interrupted buffering. In this case, a normal state of buffering means a state in which a transfer speed of a stream constituting the streaming broadcast and a quantity of a stream expected from ability of a decoder for processing the stream are the same, and underflow and overflow of data stored in the buffer memory 1202 are not likely to occur.

In step 703, the system controller 1208 judges whether or not the buffering monitoring task has ended and, if it has not ended, in step 704, judges whether or not abnormality has been detected. Here, if abnormality has not been detected, the system controller 1208 shifts to step 702 and loops. If abnormality has been detected in step 704, the system controller 1208 holds a flag showing abnormality of buffering in step 705 and, then, shifts to step 702 and loops. In addition, if the buffering monitoring task has ended in step 703, the system controller 1208 proceeds to step 706, and the buffering monitoring task ends.

Next, returning to FIGS. 6A and 6B, in step 605, the system controller 1208 reads out the packet data of the streaming broadcast stored in the buffer memory 1202 and, in step 606, analyzes a header of the read-out packet data to store necessary parameters in the internal memory. In step 607, the system controller 1208 detects whether or not the stream has ended and, if it has ended, judges whether or not the end of the stream is interruption in a normal state due to end of the streaming broadcast or interruption due to an accident in the middle of the streaming broadcast.

Next, in step 608, the system controller 1208 judges whether or not abnormality of buffering has been detected from the monitoring task in the buffering state of FIG. 7. Here, if it is judged that the buffering is performed normally, the system controller 1208 proceeds to step 614, and reads out the stream data stored in the buffer memory 1202 and divides the stream data into respective kinds of packet data such as video data and audio data to output the divided data to the decoder 1203. In step 615, the system controller 1208 subjects the divided data to decode processing for each kind. After performing temporal synchronizing processing in step 616, the data are outputted to the display 1205 and the speaker 1207 in step 617.

Next, in step 618, the system controller 1208 judges whether or not the streaming broadcast has ended. If the streaming broadcast has not ended, the system controller 1208 proceeds to step 603 and loops. FIG. 5 shows a state in which 501 to 503 of the stream data are reproduced satisfactorily according to the loop.

Here, reference numeral 513 denotes an expected quantity of the buffering described above. Audio-visual viewing is performed satisfactorily in general from a scene 0 to a scene 3 as indicated by an actual change in a buffering quantity indicated by 512.

However, at a specific time 515, a stream which should be buffered is not sent from the network, and an amount of data stored in the buffer memory 1202 starts to decrease gradually during reproduction of a scene 4 of 505. Reference numeral 514 denotes a level considered to be abnormal, that is, the amount of data stored in the buffer memory 1202 falls far short of the expected amount. As the change 512 in the buffering quantity falls below the level 514, the buffering monitoring task of FIG. 7 detects abnormality in step 702.

Therefore, in step 704, the system controller 1208 judges that there is abnormality and, in step 705, detects abnormality of the buffering. Then, also in step 608 of FIGS. 6A and 6B, the system controller 1208 judges that there is abnormality, and monitors scene partition data existing in the stream data according to step 609. If the scene partition data is not detected in step 610, the system controller 1208 proceeds to step 614, and continues audio-visual viewing of the streaming broadcast, that is, the scene 4 of 505 here, while monitoring the scene partition data.

In a short time, packet data reproduction of the stream data 401 to 406 of FIG. 4 is sequentially performed, and the system controller 1208 shifts to the packet data processing of the opening part 505 of the scene 5. Here, after detecting the scene partition data in step 609 and judging detection of the scene partition data in step 610, the system controller 1208 proceeds to step 611 and temporarily stops audio-visual viewing of the streaming broadcast being reproduced. More specifically, the system controller 1208 stops writing data in the buffer memory 1202 and holds connection by the receiver 1201 to wait for a connection state to recover. In addition, the system controller 1208 controls the video output unit 1204 to temporarily stop the audio-visual viewing by changing a display screen to a still image.

After this state is temporarily stopped in 517, some trouble of the network is eliminated, buffering is restarted, and the stored data amount of the buffer memory 1202 gradually increases. Then, when the buffering quantity has exceeded the level 514 at a point of 518, and the stored data amount has recovered to the expected level 519, the system controller 1208 judges in step 612 that the buffering quantity has recovered, and releases the temporary stop of the audio-visual viewing of the streaming broadcast according to step 613. In this case, the stream data is restarted from the opening part of the scene 5 of 506.

As described above, according to this embodiment, since the scene partition data is added to the stream data of the streaming broadcast, and a state of buffering is monitored when the streaming broadcast is viewed via a buffering means, it is detected that a flow of the stream data has been interrupted. Thereafter, upon detecting closest scene partition data, reproduction of the streaming broadcast is interrupted, whereby the streaming broadcast is interrupted in a part of a program convenient for a viewer. Therefore, natural audio-visual viewing without a sense of incongruity becomes possible compared with the case in which audio-visual viewing is interrupted suddenly in a part which is not a partition of a program.

In addition, in this embodiment, a partition of scenes is illustrated as a partition of a program. However, any partition such as a partition in progress of a story in a drama or the like, a partition of tunes in a musical program or the like, or a partition of a question and an answer in a quiz program or the like can be recorded and used as long as the partition does not give a sense of incongruity to a viewer.

Second Embodiment

In the first embodiment, when a streaming broadcast is interrupted, a program under audio-visual viewing is brought into a state of temporary stop, that is, a state of a still image or a non-display state of a display screen. However, when abnormality of buffering is detected to interrupt audio-visual viewing, another broadcast program or a stored video source prepared in advance is displayed and reproduced, whereby it is possible to cause a viewer to recognize the broadcast program or the video source as if it is a mini-program or a commercial inserted in the middle of the program, and audio-visual viewing of a program without a sense of incongruity can be provided.

In this case, it is also possible to estimate a time until restart of an interrupted program to reproduce a video source prepared in advance for the estimated time by detecting the timing 518 of FIG. 5. In addition, it is also possible to make out a schedule such that a short program such as a mini-program conveniently fits in the estimated time after the estimation was made.

Moreover, it is also possible to, while a streaming broadcast is interrupted, if restart of the interrupted streaming broadcast becomes possible while another broadcast program or a video source prepared in advance is displayed and reproduced as an alternative mini-program, extend a temporary stop state of a program of the streaming broadcast which can be restarted, continue to reproduce the alternative mini-program, and perform reproduction and audio-visual viewing of the streaming broadcast after the alternative mini-program ends.

Naturally, it is possible to restart audio-visual viewing without causing a viewer to feel a sense of incongruity for interruption of an alternative mini-program and at a point when it becomes possible to restart a streaming broadcast by applying a partition signal according to the present invention also to the alternative mini-program.

Third Embodiment

Figure 8:
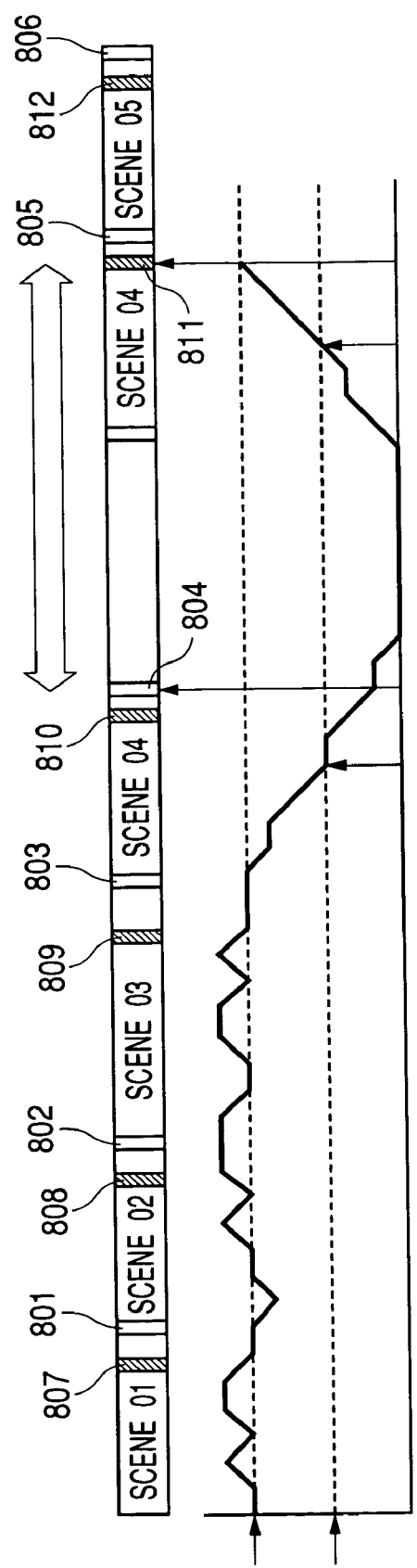
FIG. 8 is a diagram showing a reception state of data on a stream broadcast.

In the first and second embodiment, when a streaming broadcast interrupted for a viewer is restarted, audio-visual viewing is restarted from the point of 519 in FIG. 5, that is, at the point where the partition data of the scenes 4 and 5, at which audio-visual viewing is interrupted, is stored. However, in this embodiment, as shown in FIG. 8, start points in restarting an interrupted streaming broadcast indicated by reference numerals 807 to 812 are provided separately from partition data of stream data indicated by reference numerals 801 to 806 and, when a streaming broadcast is interrupted in the partition data, the streaming broadcast is restarted from an immediately preceding start point.

With such a constitution, even in the case in which, in viewing a restarted streaming broadcast, a viewer forgets story development of a program due to an interrupted period of the streaming broadcast, it is possible to easily bring viewer's consciousness back to the story of the program by starting audio-visual viewing from a scene immediately preceding a scene which has been viewed once. In addition, a contents producer who has produced the streaming broadcast designates the start points, whereby it becomes possible to further increase the effect.

Fourth Embodiment

Figure 9:
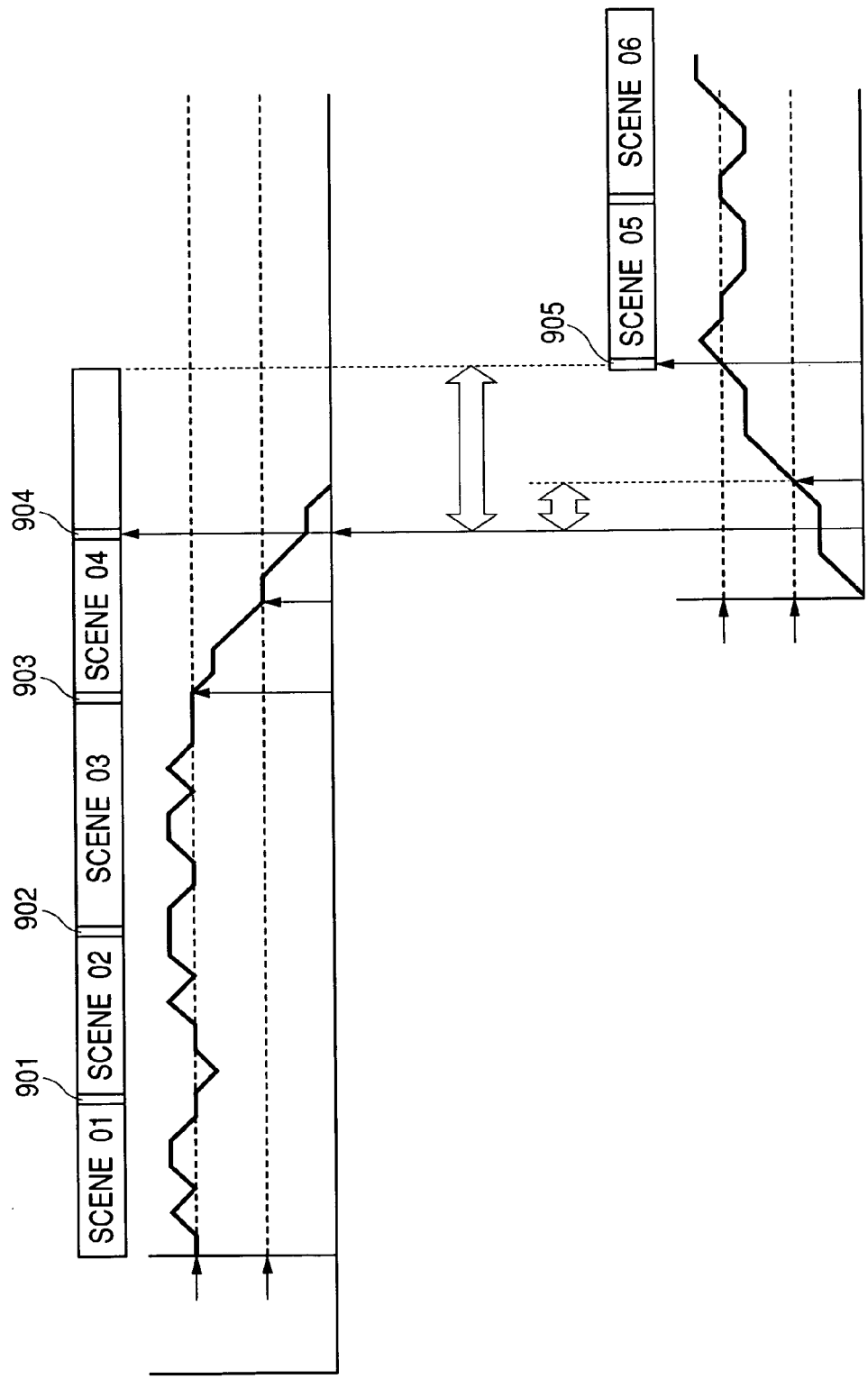
FIG. 9 is a diagram showing a reception state of data on a stream broadcast.

The first to third embodiments are premised on the fact that, when connection with a server of a connected streaming broadcast becomes unstable and a streaming broadcast under audio-visual viewing is interrupted, connection with a previously connected server is restored. However, in this embodiment, location information of another server, in which stream data of the streaming broadcast from the next scene is stored, may be stored in a header part, in which partition data indicated by 901 to 904 of FIG. 9 are stored. Consequently, new connection using location information of the above-mentioned another server is started in parallel with waiting for restart of connection with the previously connected server, and audio-visual viewing of the streaming broadcast is restarted from the next scene with one of both the servers which has succeeded in buffering earlier.

With such a constitution, quicker and surer audio-visual viewing of a streaming broadcast is made possible for a viewer.

Fifth Embodiment

Figure 10:
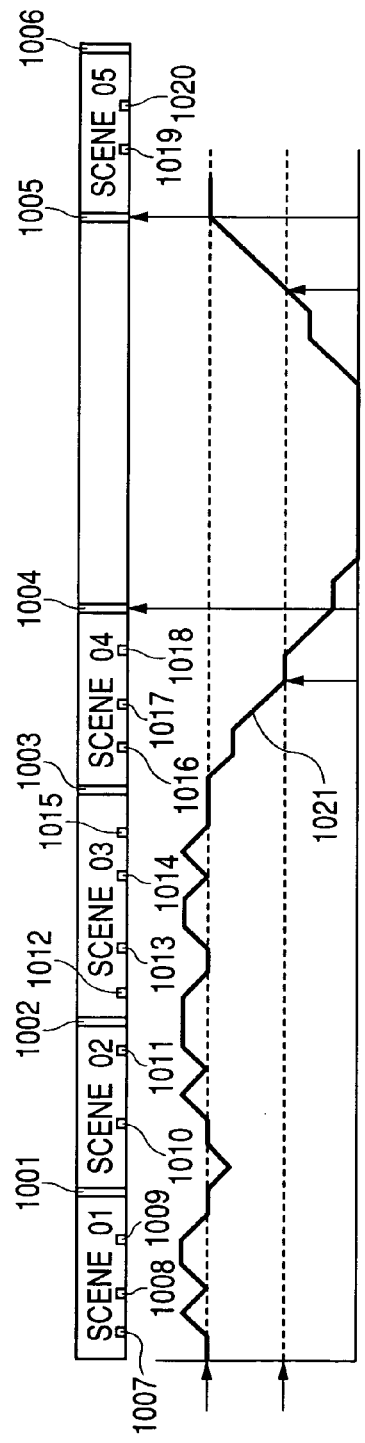
FIG. 10 is a diagram showing a reception state of data on a stream broadcast.

In the first to fourth embodiments, only one kind of partition data in stream data of a streaming broadcast is provided and, in the case in which it is detected that buffering of the stream data of the streaming broadcast is abnormal due to some cause, audio-visual viewing is temporarily stopped at a point when closest partition data is detected. However, as shown in FIG. 10, two kinds of partition data with different levels, that is, partition data of a first level 1001 to 1006, which are clear partitions in view of a story, and partition data of a second level 1007 to 1020, which are likely to increase a sense of incongruity in a viewer more or less but is naturally considered partitions in view of the story, may be provided. A selection of a level of partition data, which is an interruption point of the stream data at the time when abnormality occurs in buffering, is thereby performed according to a type of a network to which the receiving apparatus 1200 is connected or a state of buffering.

Figure 11:
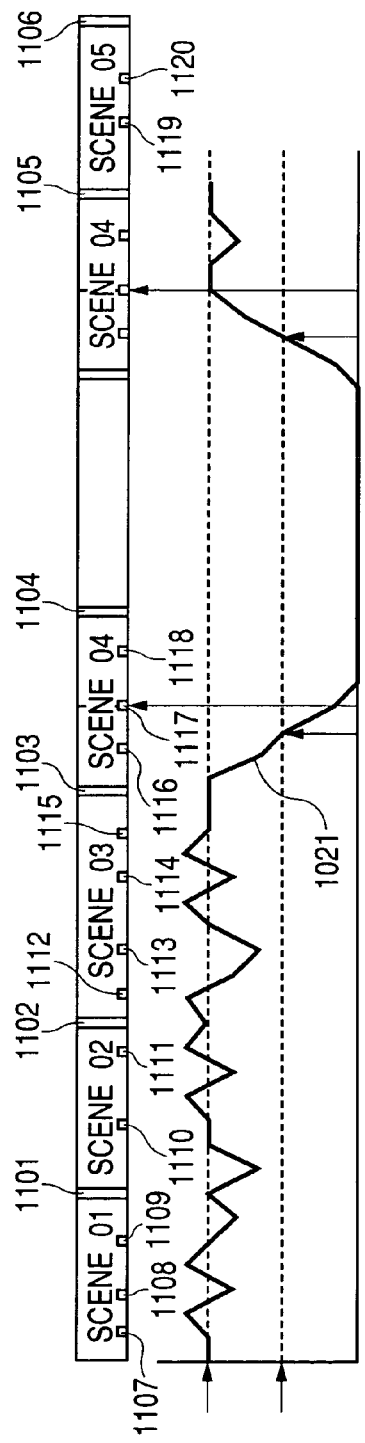
FIG. 11 is a diagram showing a reception state of data on a stream broadcast.

For example, in the case in which the network N to which the receiving apparatus 1200 is connected is particularly fast and does not need a buffering quantity so much at a normal time when there is no trouble, as indicated by a change in buffering quantity 1121 in FIG. 11, once transfer of stream data is delayed due to a trouble of the network, a buffered stream data decreases more rapidly compared with the change in buffering according to a network environment of FIG. 10. In this case, the data stream is not buffered up to the usual partition data of the first level 1104. In the case of the connection according to the above-mentioned network environment, the partition data of the second level is used to temporarily stop audio-visual viewing of a program.

With such a constitution, it becomes possible to further reduce the risk to interrupt audio-visual viewing in parts of the data stream other than both the partition data.

Sixth Embodiment

Figure 13:
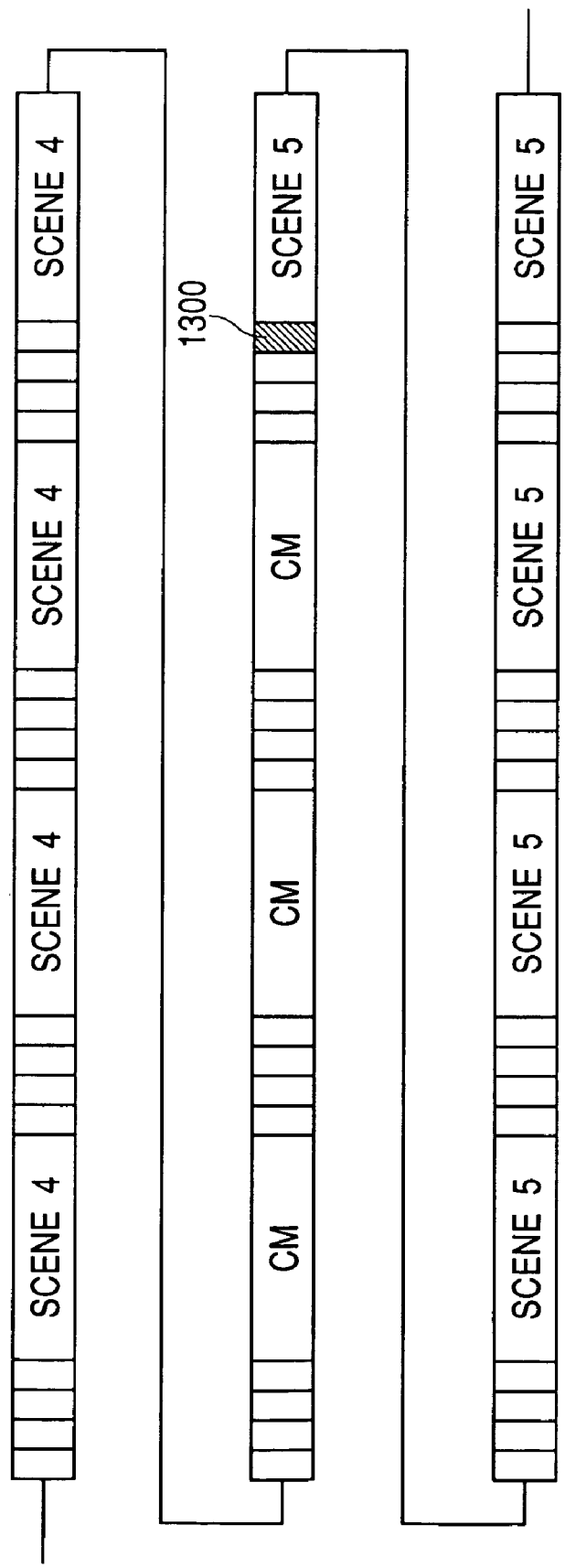
FIG. 13 is a diagram showing a state of data on a stream broadcast treated in an embodiment of the present invention.

In the first to fifth embodiments, partition data is inserted in a part suited to interrupt a streaming broadcast program as a point for interrupting the streaming broadcast program and, in the case in which abnormality is detected in a buffering state, the streaming broadcast program is reproduced up to closest partition data and then interrupted, whereby it becomes possible to perform natural audio-visual viewing without a sense of incongruity. However, in this embodiment, as indicated by 1300 in FIG. 13, partition data is inserted immediately after a CM (Commercial Message), which is inserted in a streaming broadcast program, as a point for interrupting the streaming broadcast program and, in the case in which abnormality is detected in a buffering state, the streaming broadcast program is reproduced up to closest partition data and then interrupted, that is, after presenting the CM to a user, whereby it becomes possible to perform natural audio-visual viewing without a sense of incongruity. More specifically, it is desirable to designate the point for interrupting the streaming broadcast program at a point after the end of the CM included in the data on a stream broadcast and before the start of a program following the CM. In the case in which plural CMs are discretely inserted in one program, it is desirable that the streaming broadcast program is interrupted immediately after the respective CMs and before the start or restart of a program following the CMs.

Moreover, it becomes possible to present more detailed product explanation to a viewer by presenting an image included at the end of a CM like a still image advertisement while the streaming broadcast program is interrupted. In addition, the viewer is caused to recognize the image as a still image advertisement, whereby the viewer can view the streaming broadcast in a form without a sense of incongruity.

With such a constitution, audio-visual viewing of a program without a sense of incongruity can be provided to a viewer and, at the same time, it becomes possible to provide an additional information during the interruption and to increase the effect for both of a viewer and a program provider.

Naturally, it is also possible to provide audio-visual viewing of a program without a sense of incongruity to a viewer by inserting partition data immediately before a CM.

The state detected by the present invention in which a streaming broadcast program should be interrupted is a state such as the case in which abnormality outside a receiving apparatus such as the above-mentioned abnormality of communication, abnormality of the receiving apparatus such as abnormality of a power supply for the receiving apparatus, abnormality of a connection cable, or switching of a channel by a user, a timer, or the like has occurred. In the case of the switching of a channel, it is advisable to have at least two modes, that is, a mode in which the present invention is applied and a mode in which the present invention is not applied and a channel is instantly switched.

As described above, according to the present invention, since video data is temporarily stopped in an interrupting position designated in advance in data on a stream broadcast, audio-visual viewing can be restarted without causing a viewer viewing a program to feel uncomfortable or to feel a sense of incongruity with respect to the program.

What is claimed is:
1. A receiving apparatus comprising:
    reception means for receiving data on a stream broadcast via a network;
    a memory which is capable of storing a predetermined amount of the received data on a stream broadcast;
    control means for controlling the memory to perform outputting from the memory and storing into the memory the data on a stream broadcast simultaneously so as to conserve a predetermined amount of buffering of the data;
    data processing means for processing the data on a stream broadcast stored in the memory to generate video data;
    video output means for outputting the video data processed by the data processing means to a display apparatus; and detection means for detecting interruption point data indicating an interruption position where reproduction of the stream broadcast should be interrupted out of the received data on a stream broadcast; wherein the interruption point data is incorporated in the data on a stream broadcast relating to scene partitions of a program on the stream broadcast, wherein the control means (a) monitors abnormality of communication by detecting whether the amount of buffering of the data in the memory gets under a predetermined level, (b) gets from the detection means detected interruption point data when the abnormality of the communication is detected, and (c) controls the data processing means and the video output means to (i) continue the output of the video data from a position at which the abnormality is detected to the interruption position, so as to display on the display apparatus a video image based on the video data, (ii) stop the output of the video data at the interruption position, and (iii) restart the output of the video data from a start position placed preceding the interruption position on the stream broadcast, the start position having been designated in production of the stream broadcast, in response to an amount of buffering of the data in the memory having reached a predetermined amount after stopping the output of the video data.

2. A receiving apparatus according to claim 1, wherein the control means further detects an estimated time when the output of the video data can be restarted based upon the amount of data, which is stored in the memory while the output of the video data is stopped, and the communication rate, and then controls the video output means to display information of the estimated time.

3. A receiving apparatus according to claim 1, wherein the control means further controls the video output means to output predetermined video data instead of video data according to the data on a stream broadcast after stopping the output of the video data.

4. A receiving apparatus according to claim 3, wherein, in the case in which an amount of buffering of the data on a stream broadcast stored in the memory has reached a predetermined amount after stopping the output of the video data, the control means further controls the data processing means and the video output means to restart the output of the video data from a position instructed in the interruption point data after the predetermined video data ends.

5. A receiving apparatus according to claim 1, wherein the interruption point data is data which designates a position where the stream broadcast should be interrupted after a CM ends and before a program following the CM starts, which are included in the data on a stream broadcast.

6. A receiving method, comprising the steps of:
receiving data on a stream broadcast via a network;
storing the received data on a stream broadcast on a memory;
controlling the memory to perform outputting from the memory and storing into the memory the data on a stream broadcast simultaneously so as to conserve a predetermined amount of buffering of the data;
processing the data on a stream broadcast stored in the memory to generate video data;
outputting the video data processed by the processing step for display; and
detecting interruption point data indicating an interruption position where reproduction of the stream broadcast should be interrupted from the received data on a stream broadcast, wherein the interruption point data is incorporated in the data on a stream broadcast relating to scene partitions of a program on the stream broadcast, wherein the controlling step (a) monitors abnormality of communication by detecting whether the amount of buffering of the data in the memory gets under a predetermined level, (b) gets from the detecting step detected interruption point data when the abnormality of the communication is detected, and (c) controls the processing and outputting steps to (i) continue output of the video data from a position at which the abnormality is detected to the interruption position, so as to display a video image based on the video data, (ii) stop the output of the video data at the interruption position, and (iii) restart the output of the video data from a start position placed preceding the interruption position on the stream broadcast, the start position having been designated in production of the stream broadcast, in response to an amount of buffering of the data in the memory having reached a predetermined amount after stopping the output of the video data.

7. A receiving apparatus comprising:
a receiver for receiving data on a stream broadcast via a network;
a memory which is capable of storing a predetermined amount of the received data on a stream broadcast;
a controller for controlling the memory to perform outputting from the memory and storing into the memory the data on a stream broadcast simultaneously so as to conserve a predetermined amount of buffering of the data;
a data processor for processing the data on a stream broadcast stored in the memory to generate video data;
a video output for outputting the video data processed by the data processor to a display apparatus; and
a detector for detecting interruption point data indicating an interruption position where reproduction of the stream broadcast should be interrupted from the received data on a stream broadcast, wherein the interruption point data is incorporated in the data on a stream broadcast relating to scene partitions of a program on the stream broadcast, wherein the controller (a) monitors abnormality of communication by detecting whether the amount of buffering of the data in the memory gets under a predetermined level, (b) gets from the detector detected interruption point data when the abnormality of the communication is detected, and (c) controls the data processor and the video output to (i) continue the output of the video data from a position at which the abnormality is detected to the interruption position, so as to display on the display apparatus a video image based on the video data, (ii) stop the output of the video data at the interruption position, and (iii) restart the output of the video data from a start position placed preceding the interruption position on the stream broadcast, the start position having been designated in production of the stream broadcast, in response to an amount of buffering of the data in the memory having reached a predetermined amount after stopping the output of the video data.

* * * * *